(12) United States Patent
Matsuki

(10) Patent No.: US 6,910,065 B2
(45) Date of Patent: Jun. 21, 2005

(54) SERVER SYSTEM AND METHOD FOR PROCESSING REQUESTS OF CLIENTS AND SETTING ENVIRONMENTS OF THE CLIENTS

(75) Inventor: Naoyuki Matsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 09/759,535

(22) Filed: Jan. 16, 2001

(65) Prior Publication Data
US 2001/0032255 A1 Oct. 18, 2001

(30) Foreign Application Priority Data

Apr. 13, 2000 (JP) ........................................ 2000-111488

(51) Int. Cl.⁷ ............................................. G06F 13/00
(52) U.S. Cl. ..................................................... 709/203
(58) Field of Search ......................... 707/1, 9; 709/200, 709/201, 202, 203, 222, 225; 719/330

(56) References Cited

U.S. PATENT DOCUMENTS 5,548,729 A * 8/1996 Akiyoshi et al. ........... 709/222
6,047,288 A * 4/2000 Kurosawa et al. ............. 707/9

* cited by examiner

Primary Examiner—Robert B. Harrell
(74) Attorney, Agent, or Firm—Staas & Halsey LLP.

(57) ABSTRACT

A server performing a process corresponding to requests from a plurality of clients eliminate a need for a to set an environment, which is generally required each time the user moves to another client. An environment setting information storing section stores environment setting information relation to a client. A client specifying section specifies, when a request for a process is made from a predetermined client, the client which made the request, and an environment setting section obtains environment setting Information corresponding to the client specified by the client specifying section from the environment setting information storing section and sets corresponding environment. Accordinaly, a processing section performs a process corresponding to a request based on the environment set by the environment setting section.

7 Claims, 14 Drawing Sheets

| COMPANY NAME | CLIENT ID | PERMISSION FOR USE | STATUS | LOG-IN TIME | PRINTER NAME | MONITOR RESOLUTION |
|---|---|---|---|---|---|---|
| A COMPANY | 00001 | YES | USED | 1/2 9:14 | PRINTER A | 1024×768 |
| | 00002 | NO | UNUSED | — | PRINTER B | 800×600 |
| | 00003 | YES | USED | 1/2 9:34 | PRINTER C | 1024×768 |
| B COMPANY | 00011 | YES | USED | 1/2 10:21 | PRINTER X | 800×600 |
| | 00012 | YES | USED | 1/2 10:42 | PRINTER Y | 800×600 |
| | 00013 | YES | USED | 1/2 8:12 | PRINTER Z | 1024×768 |

FIG. 6

| ACCOUNTING | | | | | | | | |
|---|---|---|---|---|---|---|---|---|
| LIST | COPY LINE | DELETE LINE | PASTE LINE | PRINT | REGISTER SUMMARY | CHANGE LEDGER | OBJECTIVE HEADING | COM-PLETE |
| DATE | CODE | HEADING NAME | SUMMARY | INCOME | EXPENDI-TURE | TAX INCLUDED |
| 99/1/20 | 2201 | DUES | AB COMPANY | | 57,454 | 12,372 |
| 99/1/21 | 6354 | ACCOUNT RECEIVABLE | C COMMERCIAL COMPANY | 247,454 | | 0 |
| 99/1/22 | 1211 | PREMIUM | D INSURANCE COMPANY | | 15,254 | 763 |
| ... | ... | ... | ... | ... | ... | ... |
| 99/1/22 | 1211 | ACCOUNT PAYABLE | D TELECOMMU-NICATION COMPANY | | 24,342 | 1,217 |

| CLIENT STATE MONITORING SCREEN FOR ADMINISTRATORS OF A COMPANY | | | |
|---|---|---|---|
| CLIENT ID | PERMISSION FOR USE | STATUS | LOG-IN TIME |
| 00001 | YES | USED | 1/2 9:14 |
| 00002 | NO | UNUSED | — |
| 00003 | YES | USED | 1/2 9:34 |

SERVER SYSTEM AND METHOD FOR PROCESSING REQUESTS OF CLIENTS AND SETTING ENVIRONMENTS OF THE CLIENTS

BACKGROUND OF THE INVENTION (1) Field of the Invention

This invention relates to a server and, more particularly, to a server for performing a process corresponding to requests from a plurality of clients.

(2) Description of the Related Art

In recent years, services to provide the processing function of an application program stored in a server to a client via Internet have been proposed.

FIG. 14 is a view showing the configuration of such a system. In FIG. 14, a server system 1 comprises a memory 1a for storing application programs and data bases (DB) and a server 1b.

A network 2 shown in FIG. 14 is the Internet and transfers information between the server system 1 and clients 3a, 3b, and 4a.

Client systems 3 and 4 are located in A Company and B Company respectively and consist of the clients 3a and 3b and the client 4a respectively.

In this system, when a user starts a predetermined application program from the client 3a and performs a predetermined process on his/her company's (A Company's) information stored in a DB, he/she logs in the server system 1 by inputting his/her user ID and password and performs the process by starting a desired application program.

In such a conventional system, an environment set by a user is saved in the server system 1. Therefore, a user who has already set an environment can use an application program from any client in the same environment, which can save the trouble of setting an environment for each client.

In a conventional system, however, settings unique to each client, such as ones for an output printer and monitor resolution, also have been managed by associating them with a user. Therefore, when a user who set an environment on, for example, the client 3a moves to the client 3b to work, he/she will need to newly set an environment, such as a printer, suitable for the client 3b. This is troublesome.

SUMMARY OF THE INVENTION

In order to address such a problem, the present invention was made. In other words, an object of the present invention is to provide a server that holds suitable environment settings for individual clients and can provide comfortable operating environments.

In order to achieve the above object, a server for performing a process corresponding to requests from a plurality of clients is provided. This server comprises environment setting information storing means for storing environment setting information regarding each client, client specifying means for specifying, in the case of a request for a process having been made from a predetermined client, the client which made the request, environment setting means for obtaining environment setting information corresponding a client specified by the client specifying means from the environment setting information storing means and setting the corresponding environment, and processing means for performing a process corresponding to the request on the basis of an environment set by the environment setting means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a view showing an example of environment setting information stored in an HDD in a server.

FIG. 10 is an example of a screen displayed when ACCOUNTING icon is operated on the screen shown in FIG. 9.

FIG. 11 is an example of a client state monitor screen for administrators.

DETAILED DESCRIPTION OF THE PREFERRED EMBODIMENTS

An embodiment of the present invention will now be described with reference to the drawings.

Figure 1:
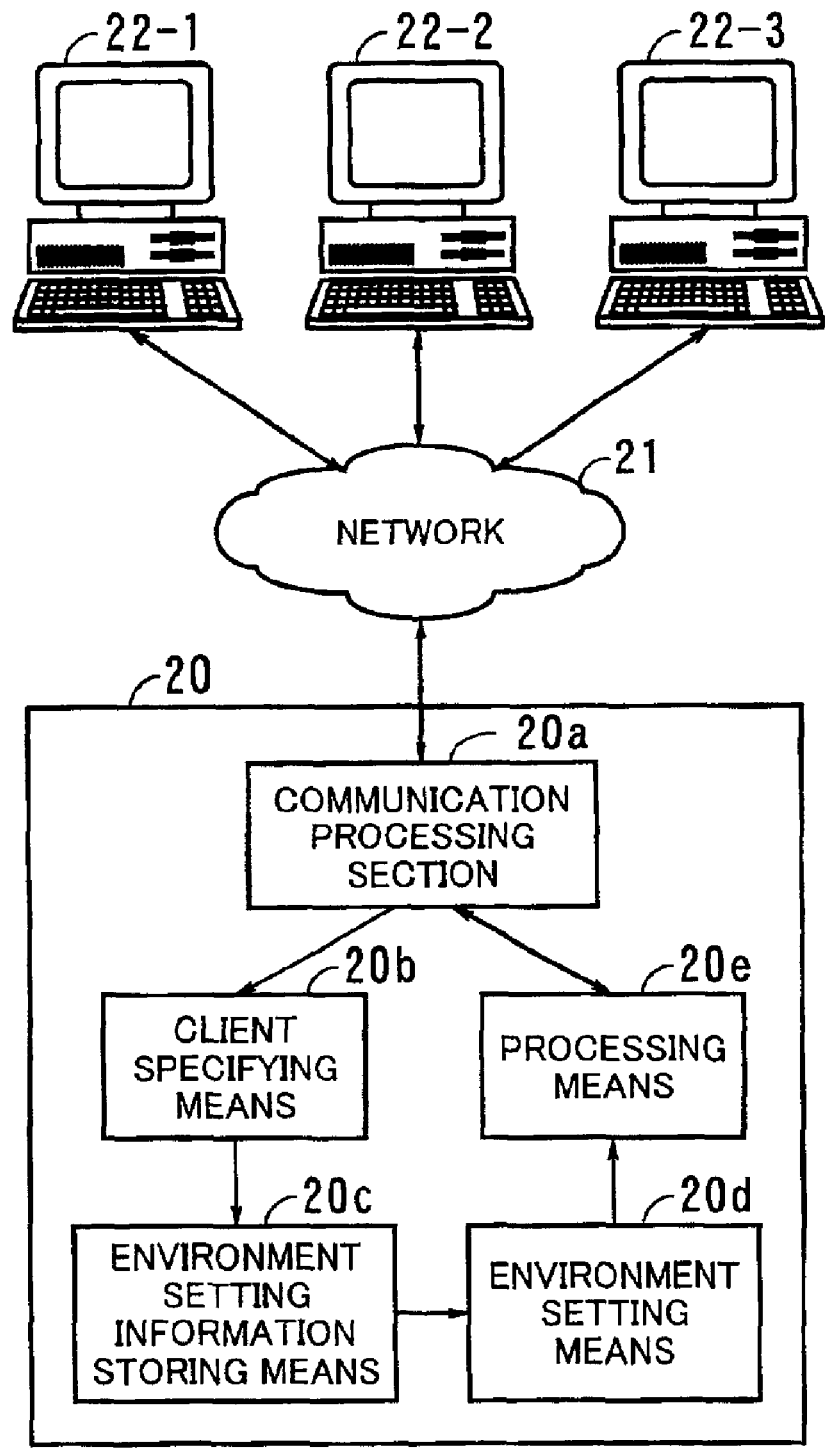
FIG. 1 is a view for describing the operating principle of the present invention.

FIG. 1 is a view for describing the operating principle of a server according to the present invention. As shown in Fig.1, a server 20 according to the present invention comprises a communication processing section 20a, client specifying means 20b, environment setting information storing means 20c, environment setting means 20d and processing means 20e and performs a process corresponding to a request sent from clients 22-1 through 22-3 via a network 21.

The communication processing section 20a performs protocol or format conversion when information is sent or received via the network 21.

The environment setting information storing means 20c stores environment setting information regarding each client.

When a predetermined client made a request for a process, the client specifying means 20b specifies the client which made the request.

The environment setting means 20d obtains environment setting information corresponding a client specified by the client specifying means 20b from the environment setting information storing means 20c and sets the corresponding environment.

The processing means 20e performs a process corresponding to a request on the basis of an environment set by the environment setting means 20d.

The network 21 comprises, for example, the Internet and sends information to or receives information from the clients 22-1 through 22-3.

The clients 22-1 through 22-3 comprise, for example, a personal computer, and send a request corresponding to a user's operation to the server 20 via the network 21 and receive and display the result of the request.

Now, operation in FIG. 1 will be described.

First, operation performed when environment setting information is set will be described. Only an administrator having special authority can set environment setting information.

It is assumed that an administrator accesses the server 20 and requests permission to input environment setting information. The client specifying means 20b gives the administrator permission to input environment setting information upon confirming that the administrator has rights of a regular administrator. Environment setting information includes information for specifying monitor resolution of the clients and an output printer for each client, etc.

An administrator permitted to input environment setting information inputs environment setting information for each of the clients 22-1 through 22-3. Environment setting information input is sent to the server 20 via the network 21 and is stored in the environment setting information storing means 20c.

Accordingly, environment setting information is set.

For example, when an ordinary user or a non-administrator accesses the server 20 from the client 22-2, the client specifying means 20b in the server 20 specifies the client which accessed the server 20, by referring to, for example, an Internet protocol (IP) address. In this example, a source address added to a header of a packet sent from the client 22-2 is referred to and the client which accessed the server 20 is specified as the client 22-2.

The environment setting information storing means 20c reads the environment setting information corresponding to a client specified by the client specifying means 20b and provides the environment setting information to the environment setting means 20d.

The environment setting means 20d sets an environment according to the environment setting information supplied from the environment setting information storing means 20c. As stated above, specific items set as an environment include a monitor resolution, an output printer, etc.

As a result of the above processes, an environment corresponding to the client 22-2 will be set.

Further, when a user makes a request from client 22-2 to perform a predetermined process, the request is received by the communication processing section 20a in the server 20 and is provided to the processing means 20e.

The processing means 20e performs a process corresponding to the request based on an environment set by the environment setting means 20d. For example, if a request to display a predetermined screen is made, then the processing means 20e generates data for displaying the screen, converts data for displaying an image in compliance with resolution set by the environment setting means 20d, and sends a reply to the client 22-2 which made the request. If a request to print out predetermined data is made, then the processing means 20e generates data for printing out and sends it to a printer designated by environment setting information.

Accordingly, when requests are made from the other clients 22-1 and 22-3, an image is displayed with resolution correspondingly set for each client or data is output to a printer correspondingly set for each client.

As described above, a server according to the present invention registers and manages environment setting information according to clients, thereby maintaining an environment setting unique to each client even when used by different users. This enables a system with high operability.

An embodiment of the present invention will now be described.

Figure 2:
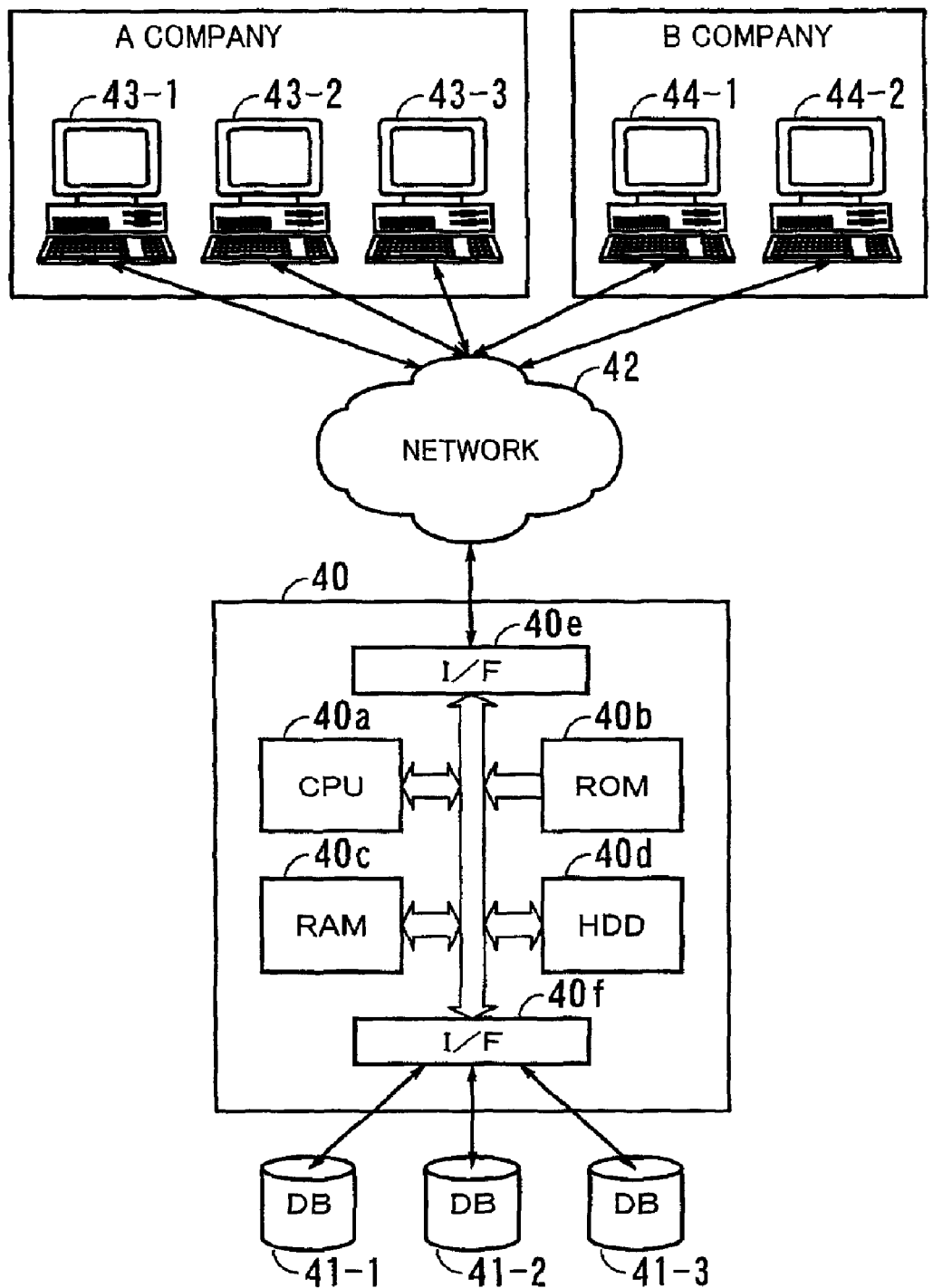
FIG. 2 is a view showing the configuration of an embodiment of the present invention.

FIG. 2 is a view showing the configuration of an embodiment of the present invention. In FIG. 2, a server 40 starts the appropriate application program and provides services, in response to a request from clients 43-1 through 43-3, 44-1, and 44-2.

The server 40 comprises a central processing unit (CPU) 40a, a read only memory (ROM) 40b, a random access memory (RAM) 40c, a hard disk drive (HOD) 40d, and interfaces (I/F) 40e and 40f. Furthermore, DBs 41-1 through 41-3 are externally connected to the server 40.

The CPU 40a controls each section of the apparatus in compliance with control programs etc. stored in the HDD 40d, starts an application program corresponding to a request from the clients 43-1 through 43-3, 44-1, and 44-2, and performs a process requested.

The ROM 40b stores basic programs executed by the CPU 40a and stores data.

The RAM 40c temporarily stores programs being executed by the CPU 40a and data being operated by the CPU 40a.

The HOD 40d stores control programs executed by the CPU 40a, application programs started in response to a request from the clients 43-1 through 43-3, 44-1, and 44-2, and the like.

The I/F 40e performs protocol or data conversion when data is sent to or received from the clients 43-1 through 43-3, 44-1, and 44-2 via a network 42.

For example, the I/F 40f comprises a small computer system interface (SCSI) etc. and sends data to or receives data from the DBs 41-1 through 41-3.

The DBs 41-1 through 41-3 comprise, an HDD etc. and store data for each company individually.

The network 42 comprises the Internet and transmits data between the clients 43-1 through 43-3, 44-1 and 44-2, and the server 40.

The clients 43-1 through 43-3, 44-1, and 44-2 comprise, for example, a personal computer and can make requests for various processes by starting browser software stored in their built-in HDDs and by logging to the server 40.

Operation in the above embodiment will now be described. Functions achieved by the embodiment of the present invention will be described briefly, then operation will be described in detail.

Figure 3:
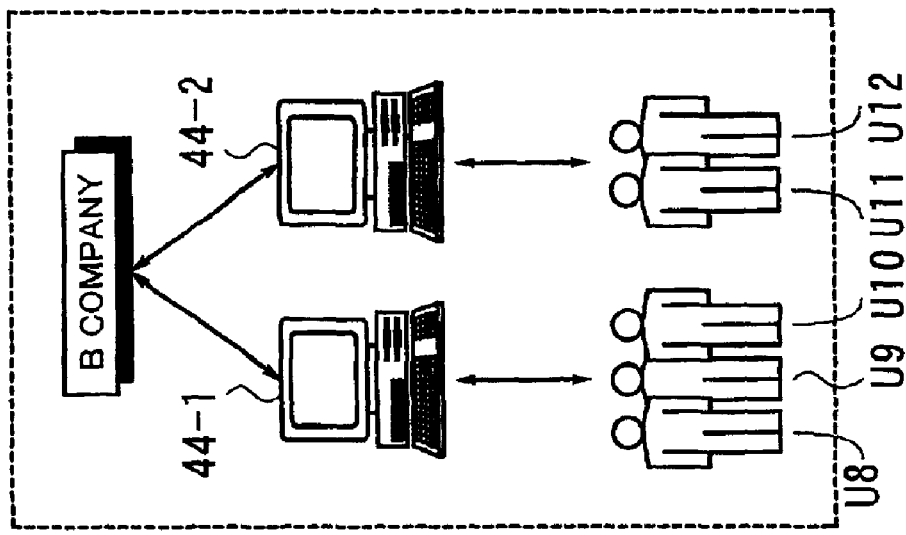
FIG. 3 is a view showing an example of how the embodiment shown in FIG. 2 is applied.
Figure 3:
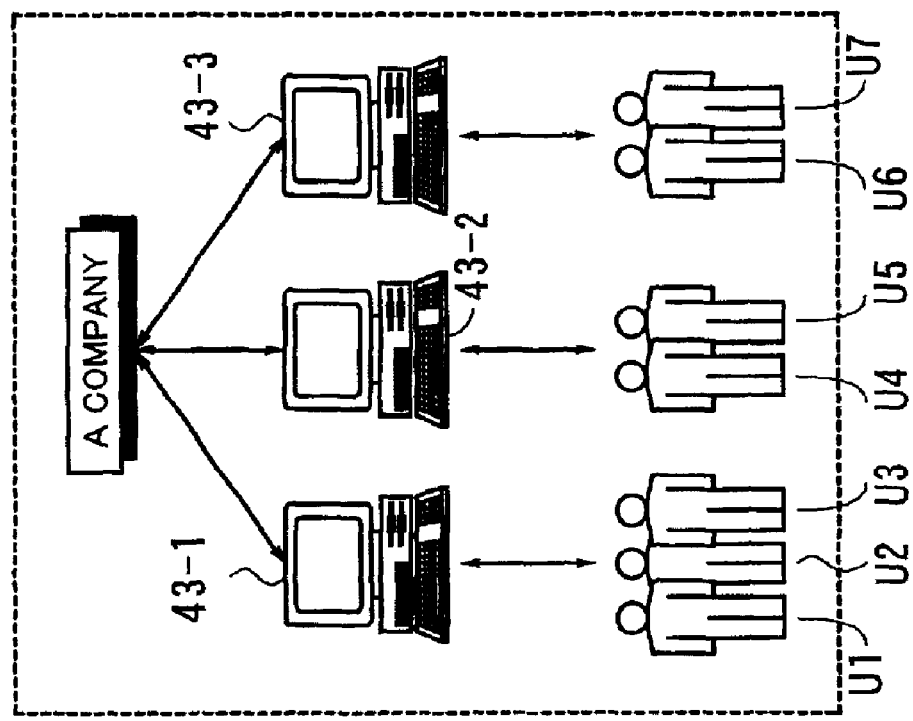

FIG. 3 is a view showing an example of how the above embodiment is applied. As shown in FIG. 3, the server in this embodiment divides objects to be managed into three hierarchies including "user," "client," and "company", and manages the same. For example, the clients 43-1 through 43-3 belong to A Company and users U1 through U7 belong to the clients 43-1 through 43-3.

Figure 4:
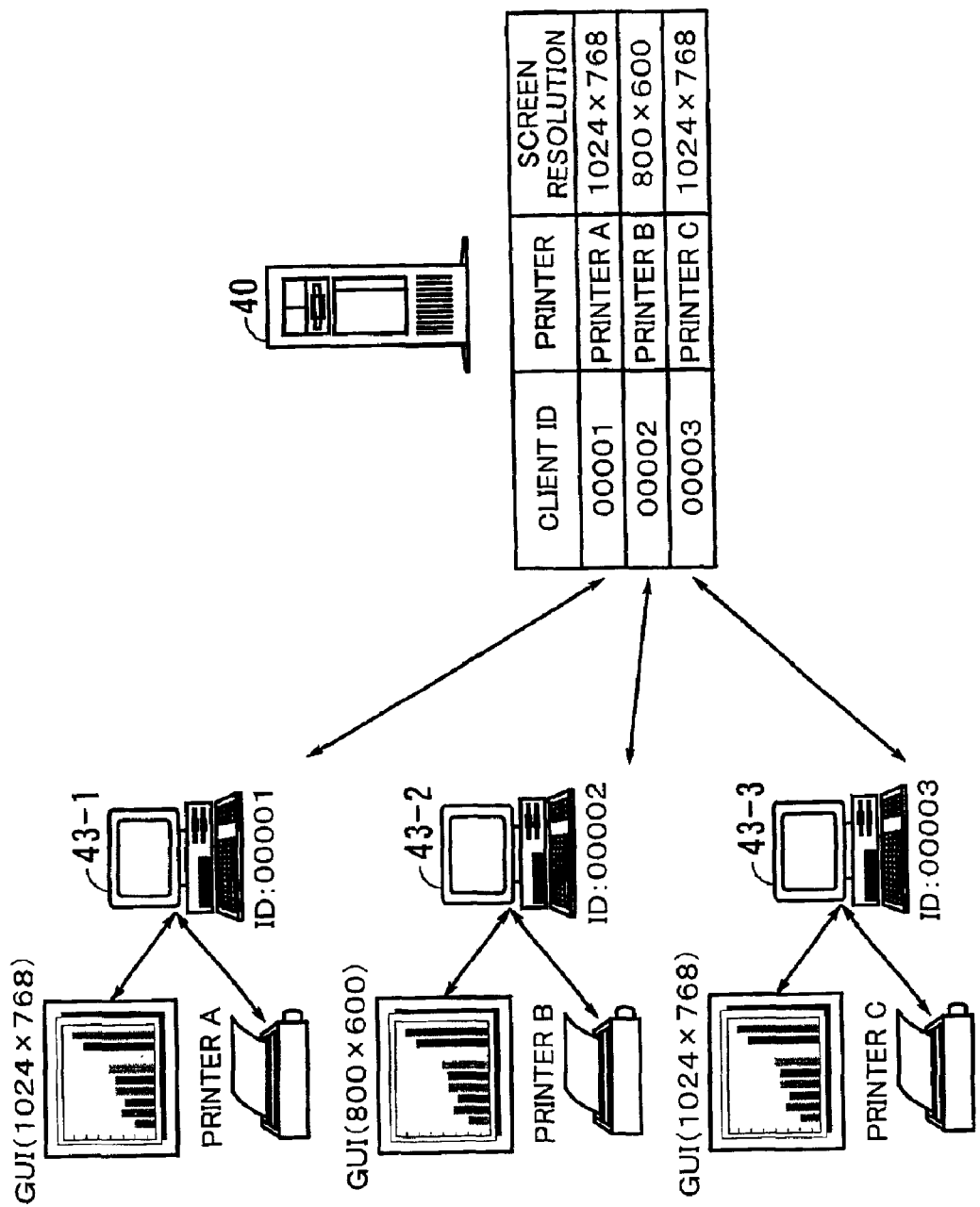
FIG. 4 is a view showing how an environment for each of the clients of A Company shown in FIG. 3 is set.

FIG. 4 is a view showing the contents of an environment set for each of the clients shown in FIG. 3, which belong to A Company. In an example shown in FIG. 4, the monitor resolution for the client 43-1 is set to "1024×768" and the output printer is set to "printer A". The monitor resolution for the client 43-2 is set to "800×600" and the output printer is set to "printer B". The monitor resolution for the client 43-3 is set to "1024×768" and the output printer is set to "printer C".

Environment setting information regarding each client is associated with a respective client ID, as shown on the right side of FIG. 4, and is stored in the server 40.

Figure 5:
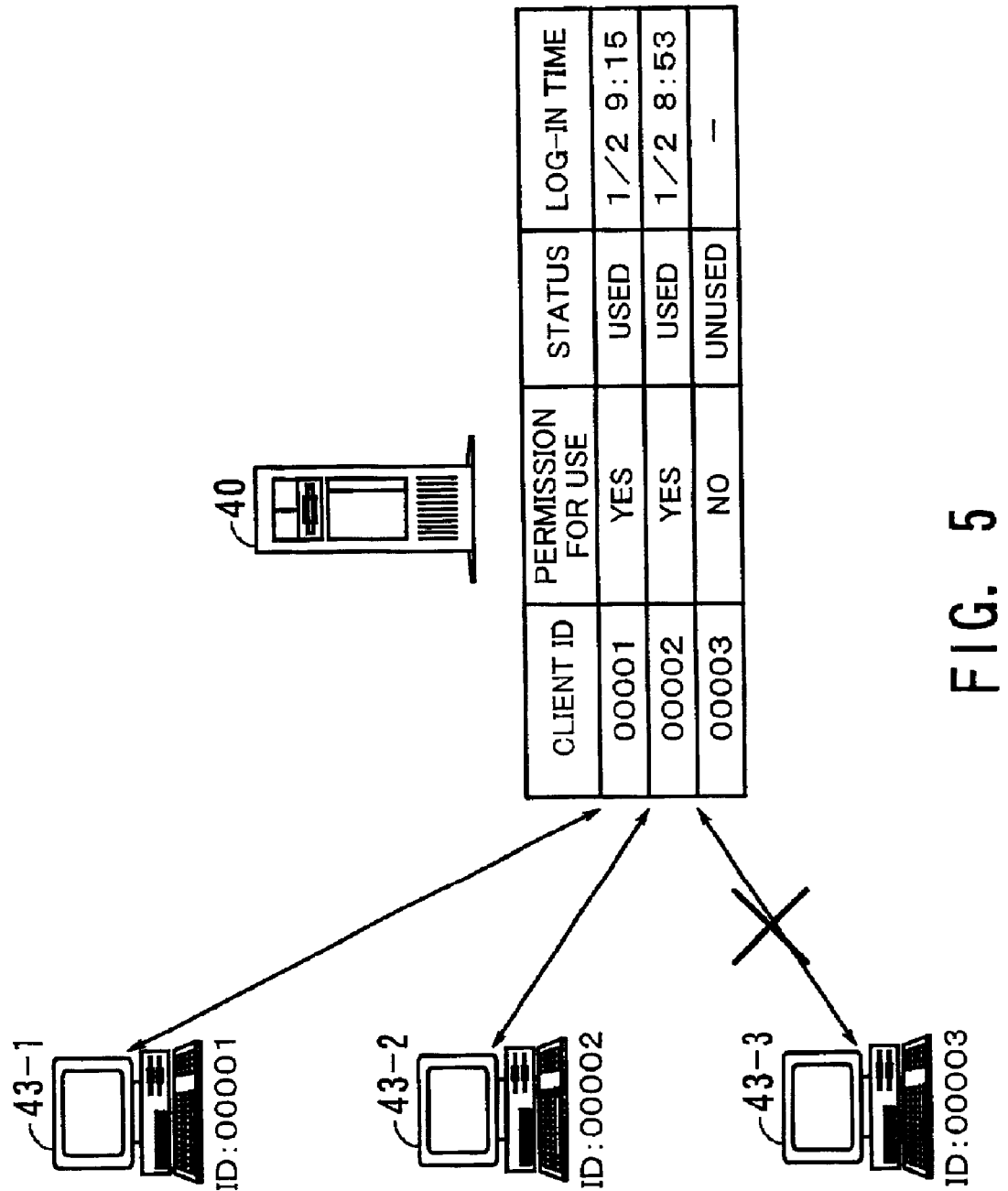
FIG. 5 is a view showing the status and log-in time of each client managed by a server.

In this embodiment, as shown in FIG. 5, the status and log-in time of each client are also managed by the server 40. For example, if the client 43-3 contracts a virus, the communication of the virus is prevented by changing the state of "Permission for Use" from "Yes" to "No" to prohibit the client 43-3 from logging in. In addition, the status (used or unused) and log-in time of each client can be monitored in real time. Therefore, when a problem arises, it is solved quickly by specifying a client to which the problem relates.

As stated above, in the embodiment of the present invention, information indicating the contents of an environment set for each client and information regarding logging to the server 40 are managed as environment setting information by the server 40, and various processes described later are performed based on this environment setting information.

FIG. 6 is a view showing an example of an environment setting information stored in the HDD 40*d* in the server 40. As shown in FIG. 6, "Permission for Use," "Status," "Log-in Time," "Printer Name," and "Monitor Resolution," which are associated with the client IDs of clients belonging to A Company or B Company, are stored as environment setting information. In this example, all these pieces of information are stored together in the HDD 40*d*. However, they may be divided according to companies and be stored severally in the DBs 41-1 through 41-3.

Now, operation in the embodiment of the present invention will be described in detail.

First, operation performed when an administrator sets environment setting information shown in FIG. 6 will be described. For example, when an administrator of A Company operates the client 43-1 and starts an application program for setting an environment. A screen which looks like the one shown in FIG. 7 will be displayed on the display device of the client 43-1. In this case, this administrator is certified as a regular one and belonging to A Company based on the Administrator's password and ID.

On this screen, a window 60 titled "Setting Screen for Administrators of A Company" is displayed and clients belonging to A Company are listed in the display area. Check boxes 60*a* through 60*c* for changing the state of Permission for Use for each client are displayed to the left of the list. DETAILS buttons 60*d* through 60*f* operated when detailed setting information regarding each client is input are displayed to the right of the list.

On this screen, when a check mark inside check box 60*c* is cleared, or removed an OK button 60*g* is operated. This information is sent to the server 40 and the CPU 40*a* changes the appropriate item included in environment setting information. As a result, the item "Permission for Use" for client 00003 shown in FIG. 6 will be changed from "Yes" to "No".

Figure 8:
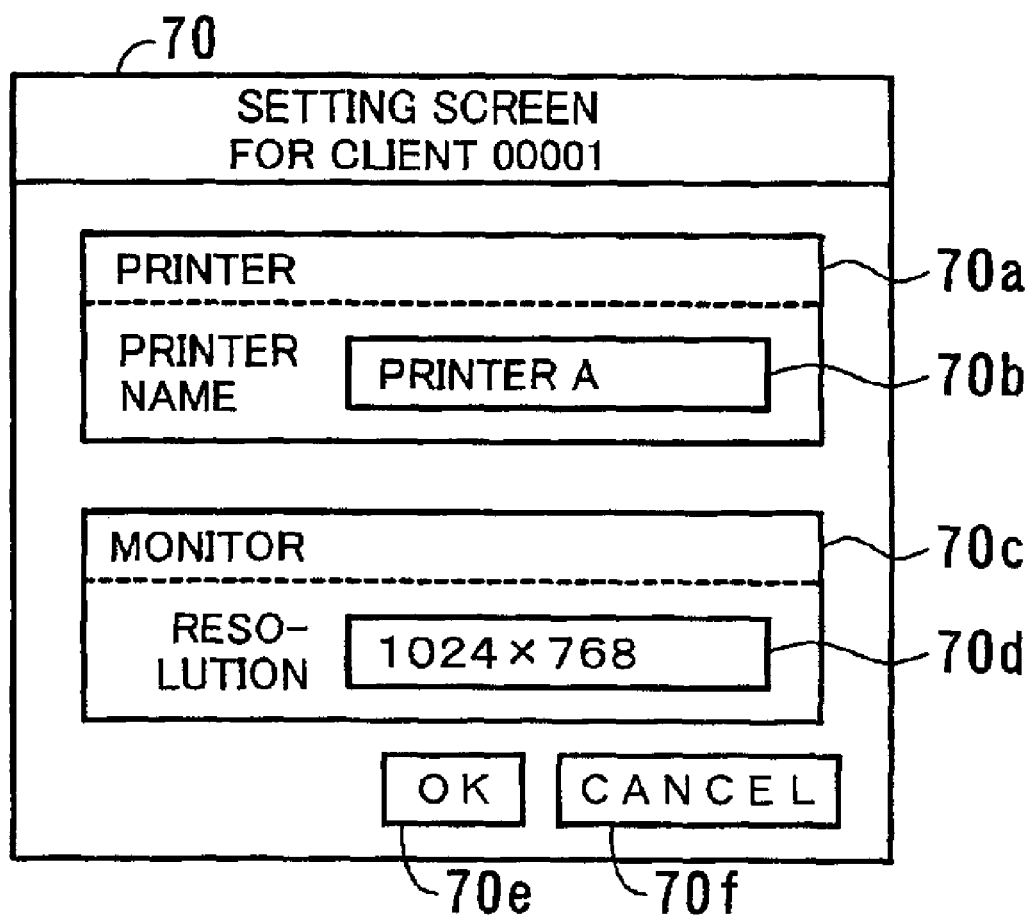
FIG. 8 is an example of a screen displayed when DETAIL button is operated on the screen shown in FIG. 7.

Furthermore, when the DETAILS button 60*d* on this screen is operated or selected, a screen which looks like the one shown in FIG. 8 will appear.

This screen is a setting screen for the client 43-1. In this example, a window 70 titled "Setting Screen for Client 00001" is displayed. In the display area, an area 70*a* for displaying setting information regarding a printer, an area 70*c* for displaying setting information regarding a monitor, an OK button 70*e*, and a CANCEL button 70*f* are displayed.

On this screen, a desired printer name or desired resolution is entered in a text box 70*b* or 70*d* and the OK button 70*e* can be operated or selected. By doing so, an output printer or monitor resolution for the client 43-1 can be set The above operation enables an administrator to set a using environment for a client.

When environment setting is completed in this way, ordinary users can log in the server 40 via each client to make a request for a process. Operation performed in that case will now be described.

For example, when a user has accessed the server 40 from the client 43-1, the CPU 40*a* refers to the user's ID and password in order to confirm whether the user is a regular user or not.

If the user is confirmed as a regular user, then the CPU 40*a* reads out a file "Cookie" stored in the client 43-1 and specifies the client using which the user logged in by referring to information stored in the file. In this example, the CPU 40*a* will specify the client using which the user is logged in as the client 43-1. "Cookie" is set by, for example, an administrator after a contract is concluded between a person who provides services by the use of the server 40 and A Company.

After client authentication is completed, the CPU 40*a* reads the appropriate environment setting information from the HDD 40*d* and sets an environment. That is to say, the CPU 40*a* reads the first piece of information shown in FIG. 6 corresponding to the client 43-1 from among environment setting information stored in the HDD 40*d*. Then, the CPU 40*a* sets the output printer to printer A and the monitor resolution to 1024×768 in compliance with the information read.

Figure 9:
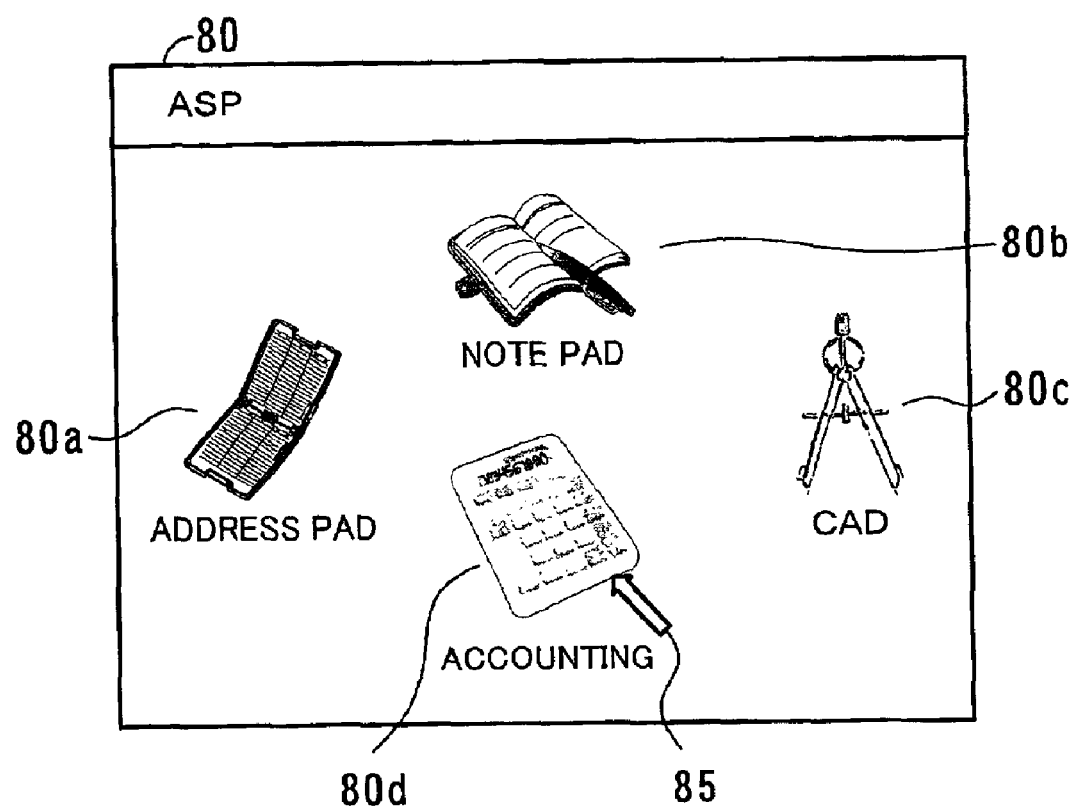
FIG. 9 is an example of a screen displayed when an ordinary client logs in a server.

Next, the CPU 40*a* generates an HTML document which indicates application programs available in compliance with the contract with A Company, as icons, and sends the same to a client which made a request. As a result, a screen which looks like the one shown in FIG. 9 will be displayed on the display device of the client 43-1.

In this example, a window 80 titled "ASP" is displayed. In the display area of the window 80, an address pad 80*a*, a note pad 80*b*, computer aided design (CAD) 80*c*, and accounting 80*d* are displayed. The types of icons displayed on this screen correspond to the contents of a contract concluded between a person who provides services by the use of the server 40 and A Company.

On this screen, when a user specifies the accounting 80*d* with a pointer 85, the client 43-1 sends the server 40 information indicating that the accounting 80*d* was specified.

The CPU 40*a* in the server 40 starts the appropriate application program stored in the HDD 40*d*. Then, the CPU 40*a* converts data for a screen to be displayed as a result of the start into data for a screen with resolution of "1024×768" in compliance with environment setting information for the client 43-1 and sends the same to the client 43-1.

As a result, a screen which looks like the one shown in FIG. 10 will appear on the display device of the client 43-1. In this example, a window 90 titled "Accounting" is displayed. Buttons for executing various commands are displayed at the top of the window 90. In the display area, cells for performing accounting are displayed.

A user can perform an objective process by operating a desired button on this screen.

Accordingly, when a PRINT button 90a on this screen is operated, then information indicating that the PRINT button 90a was operated is sent from the client 43-1 to the server 40.

The CPU 40a in the server 40 perceives that the PRINT button 90a was operated on the client 43-1, and generates print data. Then the CPU 40a refers to a printer name included in environment setting information, specifies an output printer for the client 43-1, and sends print data generated to the appropriate printer. In this example, data is sent to printer A.

The above processes enable information generated by an application program to be output to a printer designated by environment setting information.

In this embodiment, an administrator on the client side can refer to information regarding his/her company's client which has logged in the server 40. The operational procedure and operation for doing this will now be described.

When an administrator of A Company logs in the server 40 and makes a request to display a screen indicating the log-in state of a client belonging to A Company, the server 40 obtains data regarding A Company from among environment setting information stored in the HDD 40d and sends the same to the client which made the request.

As a result, a screen which looks like the one shown in FIG. 11 will appear on the administrator's display device. In this example, a window 100 titled "Client State Monitoring Screen for Administrators of A Company" is displayed. In an display area 100a, the state of clients belonging to A Company is listed. Moreover, at the bottom of the window 100, an OK button 100b operated to close the window 100 is displayed.

An administrator is able to monitor the state of each client by referring to such a screen.

Finally an example of processes performed in the above embodiment will be described.

Figure 12:
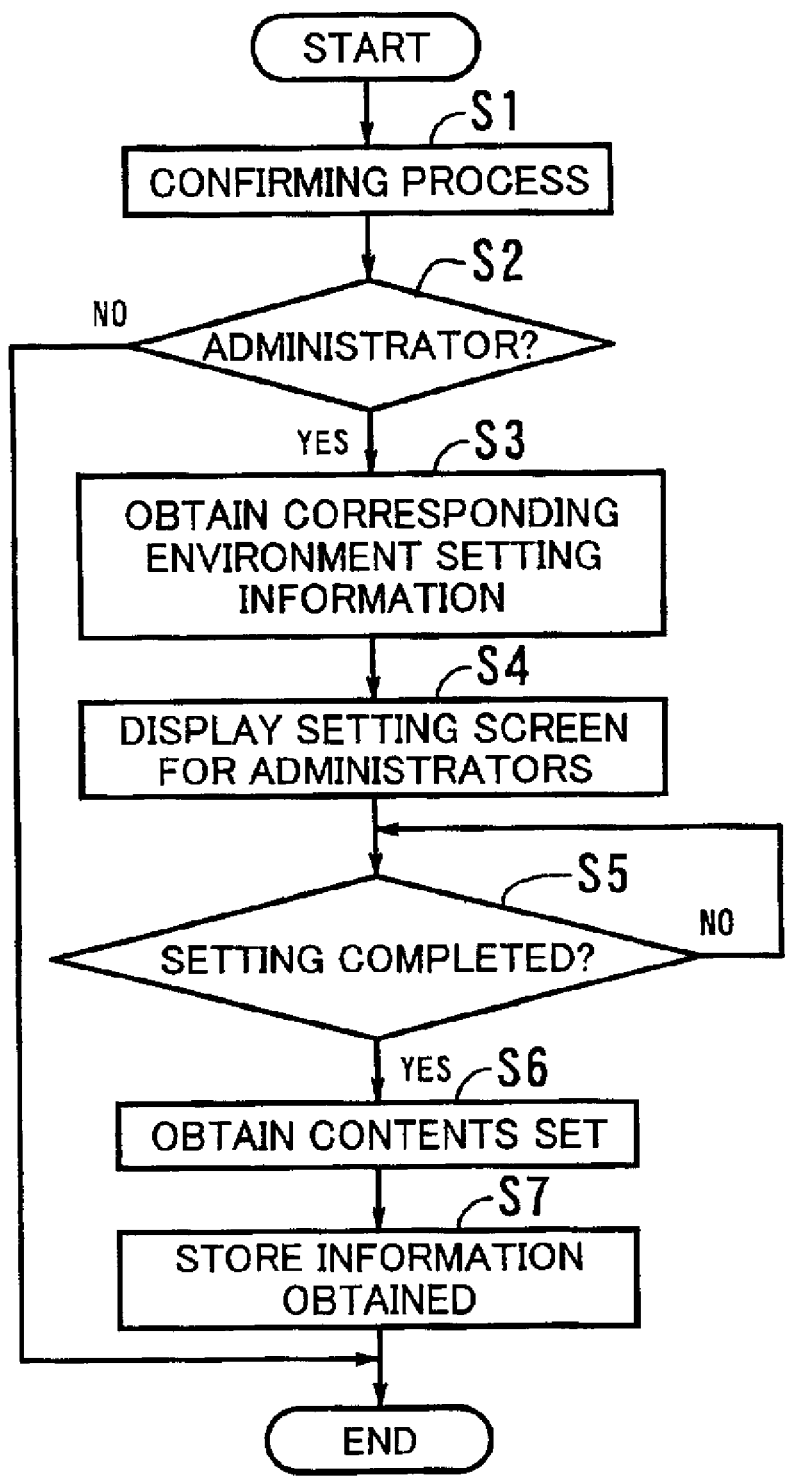
FIG. 12 is a flow chart showing an example of processes performed in a server when an administrator changes environment setting information.

FIG. 12 is an example of processes performed in the server 40 when an administrator makes a request to set an environment.

As shown, in operation S1, the CPU 40a confirms whether or not an administrator who made a request is a regular one. To be concrete, the CPU 40a confirms whether an administrator who made a request belongs to a company which intends to change settings and whether the administrator has a rightful position as an administrator.

In operation S2, the CPU 40a judges whether the administrator making the request is a regular administrator. If so, the CPU 40a proceeds to operation S3. If the administrator is not a regular administrator, the CPU 40a ends the procedure.

In operation S3, the CPU 40a obtains environment information corresponding to the administrator from the HDD 40d.

Figure 7:
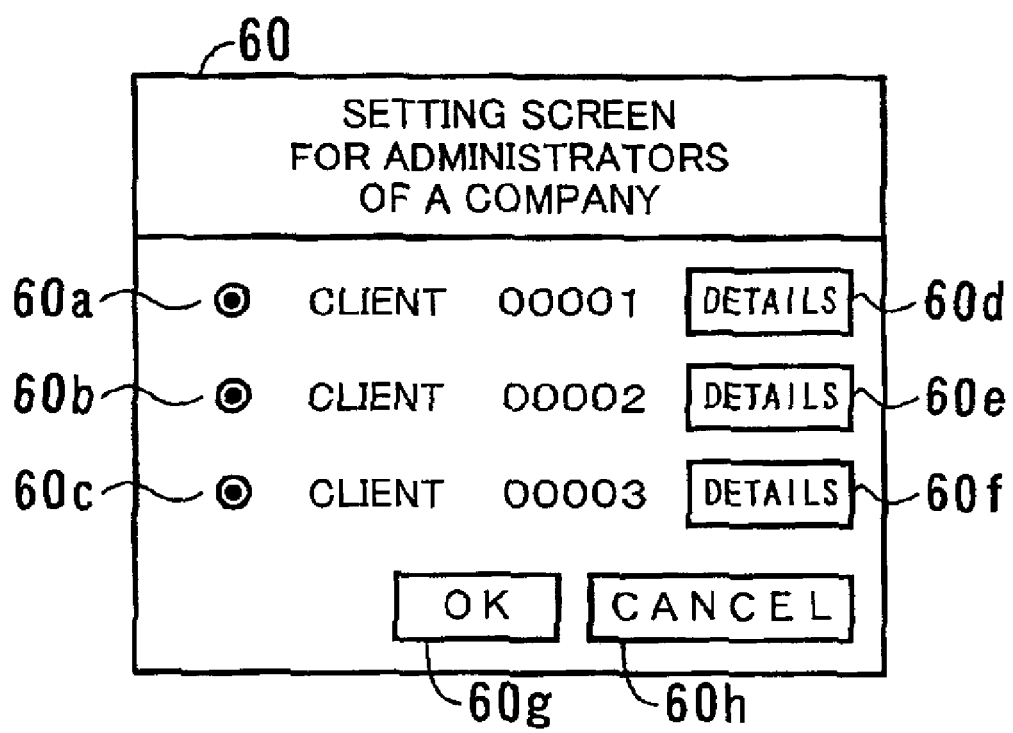
FIG. 7 is an example of a setting screen for administrators.

The CPU 40a displays a setting screen for administrators which looks like the one shown in FIG. 7 to the administrator who made a request in operation S4.

In operation S5, the CPU 40a judges whether the setting is completed. If setting is completed, the CPU 40a proceeds to operation S6. If the setting is not completed, the CPU 40a repeats operation S5.

The CPU 40a obtains contents set on the setting screens for administrators shown in FIGS. 7 and 8 in operation S6.

In operation S7, the CPU 40a stores the pieces of information obtained in the appropriate areas of the HDD 40d.

The above procedure enables an administrator to set environment setting information freely.

Figure 13:
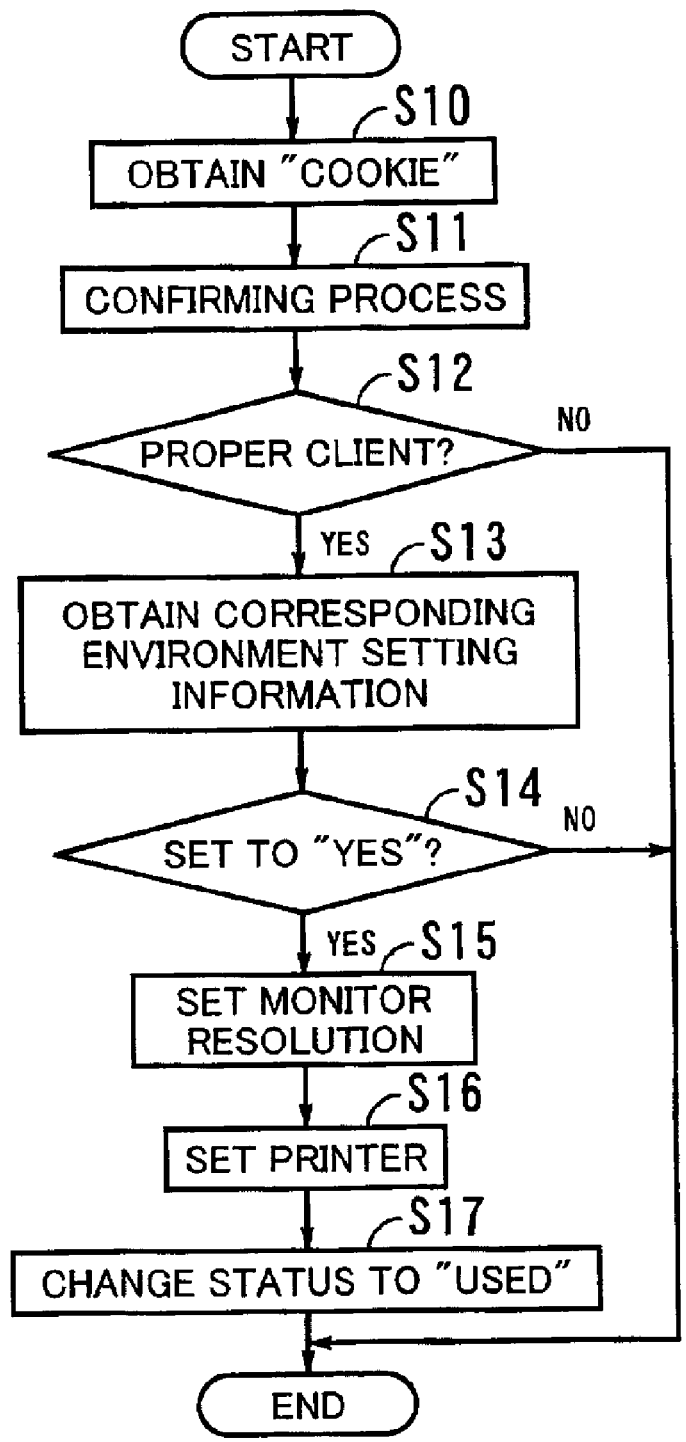
FIG. 13 is a flow chart showing an example of processes performed when an ordinary user makes a request to a server.
Figure 14:
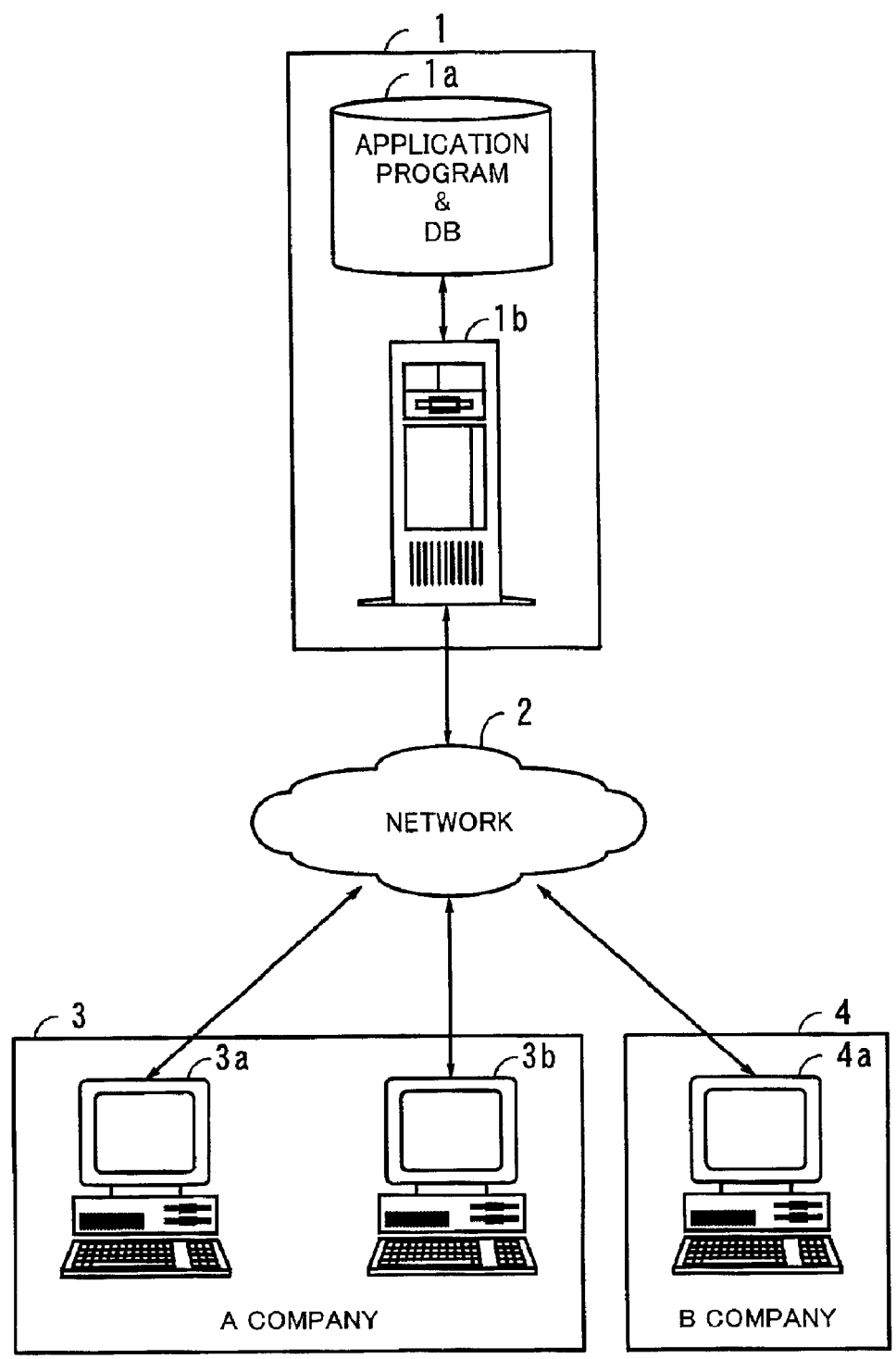
FIG. 14 is a view showing the configuration of a conventional server system.

Now, a procedure performed when an ordinary user logs to the server 40 and performs a desired process will be described with reference to FIG. 13. This flow chart will be performed when a user logs in the server 40.

The CPU 40a obtains the file "Cookie" stored in the memory of a client which made a request, as shown in operation S10.

The CPU 40a refers to information stored in "Cookie," specifies the client which made a request, and confirms whether the client is a proper one as shown in operation S11.

In operation S12, the CPU 40a judges whether the client is a proper one. If the client is a proper one, the CPU 40a proceeds to operation S13. If the client is not a proper one, the CPU 40a ends the procedure.

The CPU 40a obtains environment setting information corresponding to the specified client from the (HDD) 40d, as shown in operation S13.

In operation S14, the CPU 40a judges whether the item "Permission for Use" included in environment setting information is "Yes". If it is "Yes," the CPU 40a proceeds to operation S15. If it is not "Yes," the CPU 40a ends the procedure.

The CPU 40a sets "Monitor Resolution" in compliance with environment setting information as shown in operation S15.

The CPU 40a sets "Printer Name" in compliance with environment setting information in operation S16.

The CPU 40a changes "Status" included in environment setting information from "Unused" to "Used" in operation S17.

When an ordinary user operates a predetermined client and logs to the server 40, an environment corresponding to the client will be set in compliance with the above procedure.

In the above embodiment, only information regarding a client is stored as environment setting information. However, information regarding each user can also be stored to set an environment in compliance with this information and the above environment setting information. This method enables change of settings according to users without changing settings unique to each client.

In the above embodiment, a client is specified on the basis of information stored in "Cookie," but the present invention is not limited to such a case. For example, a client can be specified based on an address given to a packet sent from the client.

Finally, the above procedure can be achieved with a computer. In that case, the contents of a function which a server must have are described in a program recorded on a record medium which can be read with a computer. The above procedure is achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, it can be stored in a memory of a computer connected via a network and be transferred to another computer via a network. When this program is executed on a computer, it is stored on a hard disk etc. in the computer and is loaded into a main memory.

As described above, a server for performing a process corresponding to requests from a plurality of clients according to the present invention comprises environment setting information storing means for storing environment setting information regarding each client, client specifying means for specifying, in the case of a request for a process having been made from a predetermined client, the client which made the request, environment setting means for obtaining environment setting information corresponding a client specified by the client specifying means from the environment setting information storing means and setting the corresponding environment, and processing means for performing a process corresponding to a request on the basis of an environment set by the environment setting means. This can save a user the trouble of changing environment settings, each time the user moves to another client.

The foregoing description is considered to be illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server for performing a process corresponding to requests from a plurality of clients, the server comprising:

environment setting information storing means for storing environment setting information in relation to each client;

client specifying means for specifying, when a request for a process is made from a predetermined client, the client which made the request;

environment setting means for obtaining environment setting information corresponding to the client specified by the client specifying means from the environment setting information storing means and setting a corresponding environment;

processing means for performing the process corresponding to the request based on the environment set by the environment setting means; and client state information storing means for storing information indicating a state of each client, where when the request for the process is made from a client having information stored in the client state information storing means indicative of a prohibited use, the processing means executes an operation to reserve performance of the process, and the client specifying means specifies the client by referring to information included in a packet sent from the client.

2. The server according to claim 1, wherein the environment setting information depends on a using environment for each client.

3. The server according to claim 1, wherein the clients are used by one or more users, and the environment setting information includes information which depends on a using environment for each client and information which depends on each user, and the environment setting means sets an environment in compliance with the information which depends on the using environment for each client and the information which depends on each user.

4. The server according to claim 1, further comprising:

environment setting information inputting means for accepting input of the environment setting information from a client side.

5. The server according to claim 1, wherein the environment setting information stored and/or set only when input by an authorized user.

6. The server according to claim 1, wherein the client specifying means specifies the client by referring to an address given to the client.

7. A computer-readable record medium recording a server program for performing a process corresponding to requests from a plurality of clients, the program executing operations, comprising:

storing environment setting information in relation to each client;

specifying, when a request for a process is made from a predetermined client, the client which made the request;

obtaining environment setting information corresponding to the client specified from the stored environment setting information and setting a corresponding environment;

performing the process corresponding to the request based on the environment set; and storing information indicating a state of each client, where an operation to reserve performance of the process is executed when the request for the process is made from a client having information stored indicative of a prohibited use, and the client is specified by referring to information included in a packet sent from the client.

* * * * *

UNITED STATES PATENT AND TRADEMARK OFFICE
CERTIFICATE OF CORRECTION

PATENT NO. : 6,910,065 B2
DATED : June 21, 2005
INVENTOR(S) : Naoyuki Matsuki

It is certified that error appears in the above-identified patent and that said Letters Patent is hereby corrected as shown below:

<u>Title page,</u>
Item [57], ABSTRACT,
Line 2, before "eliminate" insert -- to --, and after "for a" insert -- user --.
Line 5, after "information" insert -- in --.
Line 9, delete "Information" insert -- information --.
Line 12, after "sets" insert -- a --, and delete "Accordinaly" insert -- Accordingly --.

<u>Column 10,</u>
Line 20, after "information" insert -- is --.

Signed and Sealed this

Seventh Day of February, 2006

JON W. DUDAS
*Director of the United States Patent and Trademark Office*